(12) United States Patent
Johnson et al.

(10) Patent No.: US 6,540,520 B2
(45) Date of Patent: Apr. 1, 2003

(54) INTELLIGENT TUTORING METHODOLOGY USING CONSISTENCY RULES TO IMPROVE MEANINGFUL RESPONSE

(76) Inventors: Benny G. Johnson, 5275 Sardis Rd., Murrysville, PA (US) 15668; Dale A. Holder, P.O. Box 42, Russell Springs, KY (US) 42642

( * ) Notice: Subject to any disclaimer, the term of this patent is extended or adjusted under 35 U.S.C. 154(b) by 184 days.

(21) Appl. No.: 09/769,910

(22) Filed: Jan. 25, 2001

(65) Prior Publication Data

US 2001/0044098 A1 Nov. 22, 2001

Related U.S. Application Data

(60) Provisional application No. 60/178,200, filed on Jan. 26, 2000.

(51) Int. Cl.[7] .............................. G09B 11/00; G06E 3/00
(52) U.S. Cl. ................... 434/322; 434/307 R; 706/927; 706/14
(58) Field of Search ................................. 434/118, 322, 434/323, 276, 298; 706/927, 16, 27, 47, 32, 19, 25

(56) References Cited

U.S. PATENT DOCUMENTS

| | | | |
|---|---|---|---|
| 4,670,848 A | | 6/1987 | Schramm |
| 5,167,012 A | | 11/1992 | Hayes et al. |
| 5,372,507 A | | 12/1994 | Goleh |
| 5,386,498 A | | 1/1995 | Kakefuda |
| 5,597,312 A | | 1/1997 | Bloom et al. |
| 5,727,950 A | * | 3/1998 | Cook et al. ................. 434/350 |
| 5,809,493 A | | 9/1998 | Ahamed et al. |
| 5,813,865 A | | 9/1998 | Greenbowe et al. |
| 5,870,731 A | * | 2/1999 | Trif et al. .................... 434/118 |
| 5,885,087 A | * | 3/1999 | Thomas ....................... 434/118 |
| 5,915,971 A | * | 6/1999 | Ramsay et al. ............. 434/262 |
| 6,112,051 A | * | 8/2000 | De Almeida ................. 345/780 |
| 6,171,109 B1 | * | 1/2001 | Ohsuga ....................... 434/118 |

OTHER PUBLICATIONS

Lower, Stephen, Computer–Assisted Instruction in Chemistry, Computer Series, 2, 1979, vol. 56, No. 4. (journal chem. ed.).

Eggert, Arthur, Chemprof, Computer Series. 125, May 1991, vol. 68, No. 5 in journal of chem. ed.

Birk, James P., The computer as Student, Journal of Chem. Ed., Apr. 1992, vol. 69, No. 4.

Eliot, Christopher, An Operation Representation for Building Intelligent Tutors, University of Massachusetts, user modeling '94.

Eliot Christopher, Use of an On–Line Web–Based Learning System to Enhance Student Understanding in Introductory Chemistry, 1994 University of Massachusetts.

* cited by examiner

*Primary Examiner*—Joe H. Cheng
*Assistant Examiner*—Kathleen M Christman
(74) *Attorney, Agent, or Firm*—McKay & Associates, PC

(57) ABSTRACT

A computerized method for providing a meaningful response in an intelligent tutor. The method includes the steps of receiving an input from a user solving a problem and determining if the input violates at least one consistency rule. The consistency rules are rules implemented to allow a constraint of the input to be evaluated and compared to a fundamental rule set for the problem. The fundamental rule set includes a plurality of principles that impose the constraints on a resulting solution. A student's mistake is applied to the consistency rules to allow the artificial intelligence program to respond to the answer by either providing a necessary principle overlooked by the student, or allows the program to, at a minimum, generate feedback to say something educationally useful to the student. This can be done even when buggy rules have failed to match and provide a rationale for the mistake.

17 Claims, 4 Drawing Sheets

INTELLIGENT TUTORING METHODOLOGY USING CONSISTENCY RULES TO IMPROVE MEANINGFUL RESPONSE

SPECIFIC REFERENCE

Applicant hereby claims benefit of priority date so established by provisional application Ser. No. 60/178,200, filed Jan. 26, 2000.

BACKGROUND

1. Field of the Invention

The present invention relates to the use of artificial intelligence and its application to tutorial programs. In particular, a computerized methodology is disclosed for a tutoring curriculum that interacts with the misconceptions of a student.

2. Description of the Related Art

Tutoring relies heavily on the tutor to assume what the student was thinking at the time he or she made a mistake in a problem. Personal tutors assist a student in learning a subject by figuring out that a solution to a problem is wrong and then showing the student a correct solution. However it is often difficult to show the student why he or she is wrong. Understanding why a misconception was made allows the student to acquire a more rational understanding of a problem.

An intelligent tutoring system is defined as an educational program capable of humanlike thought processes, such as reasoning and learning. An application of intelligent tutoring is a computer utilizing educational software derived from expert programming. Expert knowledge in a field is important for programming artificial intelligent systems. Similarly, expert knowledge in a subject, as well as expertise in the teaching of the subject, is necessary for the development of intelligent tutoring systems.

Expert systems and artificial intelligence systems are known in the art. See U.S. Pat. No. 4,670,848 to Schramm. This system is characterized by its interaction with a user in gathering statements through inquiries to develop the most specific understanding possible by matching of the statements with a database. See also, U.S. Pat. No. 5,386,498 to Kakefuda. An expert system is disclosed that expresses knowledge of a human expert using knowledge modules. An inference result is based on a determined certainty factor during execution of the process.

Intelligent tutoring systems utilizing artificial intelligence have also been developed. See, for example, Bloom et al., U.S. Pat. No. 5,597,312 and, in particular, a computer-assisted instruction method taught in "Computer-Assisted Instruction in Chemistry" by Lower et al. from the *Journal of Chemical Education*.

Intelligent tutoring involves justifying steps by rules as a student works through a problem, ultimately to its solution. An expert can find a correct solution to a problem in the least amount of steps, obviously by having mastered the understanding of the most helpful rules used for the problem. A student learning a subject is best instructed on a step-by-step method because as long as a student gets to a correct solution, even by taking a different 'path', the student has still been able to rationalize what he or she knows along the way. What the student did not know during the course of the solving of the problem would be rationalized by the system as the student performs each step.

Currently, intelligent tutoring systems rationalize mistakes made by a student by implementing a direct model of misconception, called buggy rules, which are also production rules. A buggy rule anticipates a mistake by a student, so that if the student performs a wrong step in the solution to a problem, the system can target the mistake and take a specific action. This production rule model rationalizes a mistake by matching the student's mistake to the particular rule violation already anticipated and pre-programmed. The prior art intelligent tutoring system not only figures out that a performed step in a solution is wrong, but also that it is wrong because the student matches the action of the pre-programmed rule. The system then correlates the mistake to this common misconception and suggests to the student that the mistake was made because of the misconception associated with the buggy rule.

Thus, in conventional artificially intelligent tutor systems (ITS) the program is primarily oriented to help the student by showing the right next step and explaining why the right step is right (using the knowledge of the expert system). In the present invention, the rules have a much different outlook inasmuch as they serve to explain to the student why a wrong step is wrong. This is much more important to a beginning student in developing the proper mental schemes than studying or memorizing the correct solution. The prior art can achieve this only when the error is anticipated.

Understanding science and other curriculum means utilizing equations, methods, and rules to ultimately find a solution to a problem. Fundamental rules are sometimes overlooked as a student tries to understand more recently studied subject matter. For instance, a student concentrating solely on a single chapter may overlook or forget a fundamental principle he or she learned prior to the lesson. The student may have also made a simple mistake based on a principle he or she had known before, but simply forgot it or was unaware of its relevance. The student might even have simply made a typographical error, but not realized this has led to an unreasonable result.

Thus, certain mistakes may be made that cannot possibly be matched and correlated to an anticipated buggy rule. The sole use of buggy rules for tutoring students targets only a narrow range of possible mistakes made by a student in a step-by-step method of teaching.

There is a need for a methodology that improves the intelligence of the tutor by implementing a rule set that always allows for a meaningful response and which is used even when the production rules fail. Termed herein as consistency rules, the rules target the mistakes that cannot be explained through application of buggy rules, thereby providing a new way to determine whether a student's step is "wrong" more reliably. This is accomplished by evaluating and comparing the inputted solution to an expanded fundamental rule set representing relevant constraints on the solution to assess whether or not the solution is reasonable.

The conventional assessment of "wrong" is that the student's step is not in the conflict set (the set of all possible correct next steps generated by the expert system). In the present methodology, "wrong" is defined as a violation of a consistency rule (CR) in a new tutor rule set. If the set of CR's is complete for the problem domain, then if a step can be proven to be wrong by a fundamental principle in the context of the student's work so far, it will violate a CR. Violation of a CR guarantees the step is wrong. A wrong answer not matched or anticipated by a pre-programmed buggy rule can still violate a fundamental principle. The present methodology of using consistency rules allows an educational software program to always say something meaningful when a wrong step in the solution is identified, thereby improving the quality of diagnosis of a student's mistake.

SUMMARY OF THE INVENTION

The present AI methodology is directed to an improved intelligent tutorial utilizing rules that evaluate a constraint on a solution and compare this constraint with an improved, more general rule set. By expanding beyond the model of misconception that accounts for the mistakes of students, in which many student errors were previously unable to be tutored from the sole application of production rules, the consistency rules deliver qualitative, conceptual feedback for intelligent tutors.

This is accomplished by assessing the reasonableness of a solution based on an evaluation of a constraint on the solution imposed by a relevant fundamental principle. The basis of the consistency rule is that any wrong answer had to have violated a relevant principle, even when the error is outside of those normally anticipated by an artificial intelligent system. Thus, the present methodology accounts for all possible violations to provide a meaningful response.

By expanding the fundamental rule set by implementing a means for evaluating a constraint on the solution, the CR's are further capable of augmenting existing, programmed production rules with the functionalities of the consistency rules. The consistency rules used by the system do not all have to be entirely new. Using existing production rules as consistency rules is helpful. A CR is a more general way of representing expert knowledge than a production rule because it represents a constraint as opposed to a specific step. A production rule is simply a special case of the more general concept of the present implementation of the consistency rule.

A step in the solution to a problem as input by the student is evaluated by the system. In a wrong step, an intelligent tutorial tries to match the mistake made by the student by processing the answer by all buggy rules, pre-programmed by the expert, to determine a possible reason why the student missed the solution. The standard program, then, can judge that the answer is wrong by taking the equivalent steps as the student to come up with the same wrong solution. However, the step made by the student may not match the anticipated buggy rule because the number of wrong answers possible in a problem are not finite. Production rules, or buggy rules, use steps to evaluate the answer. The present methodology is indefinite and does not use steps. Thus, wrong answers that may not be explained by the buggy rule are accounted for. If the solution is outside the range of the constraint, the consistency rule can teach a student a necessary principle relevant to a problem.

In fact, the present methodology allows for more than one response for a single step. A technique is then provided for efficiently diagnosing whether a student has multiple errors in a given single wrong step, and what those errors are.

It is the objective of the present invention to provide a plurality of consistency rules to an intelligent tutor, thereby allowing a wrong step in a solution to a problem, which may not accounted for by buggy rules, to be filtered and evaluated based on constraints on the input.

It is further an objective of the present invention to combine this constraint to correspond to a concept or principle to deliver conceptual, qualitative feedback.

It is further an objective of the present invention to remind students of fundamental principles and their applications that should be learned as they attempt to understand problems. This occurs where a wrong step in a solution does not satisfy the constraint evaluated by the consistency rule.

It is further an objective of the present invention to say something educationally meaningful about a wrong answer, as a minimum, if a particular misconception is unidentified by the intelligent system.

It is yet another objective of the present invention to augment existing production rules with the functionalities of the consistency rules to increase the robustness of the intelligent tutorial.

It is further an objective of the present invention to allow for the diagnosis of multiple errors in a given single wrong step of a problem, and to display what each of those errors are.

Accordingly, what is provided is a computerized method for providing a meaningful response in an intelligent tutor, comprising the steps of accepting a problem and determining if this problem has a solution consistent with a plurality of applicable constraints. If the problem has a solution consistent with all applicable constraints, input in the form of a step to a solution is received having at least one of the constraints imposed thereon. It is then determined if the input violates a consistency rule, wherein at least one of the constraints is evaluated and compared to a fundamental rule set data structure containing a plurality of fundamental principles. Feedback can then be generated by telling the user the input is wrong because it violates at least one fundamental rule of the fundamental rule set.

A "buggy" rule used herein is a production rule that is pre-programmed to match an incorrect response to an erroneous solution developed from the anticipated misconception. "Consistency" rules are now used herein to refer to rules programmed to allow an educational response to an error even if the error is not anticipated or does not correspond to a specific misconception. The flow charts represent the program flow that can be implemented on computer readable media tangibly embodying the program of instructions executable by standard, general-purpose computers or which can be implemented as specialized devices.

DETAILED DESCRIPTION OF THE PREFERRED EMBODIMENT

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated method, and such further applications of the principles of the invention illustrated herein, as would normally occur to persons skilled in the art to which the invention relates.

The overall method of an intelligent tutorial using the present invention can be understood with reference to FIG.

Figure 1:
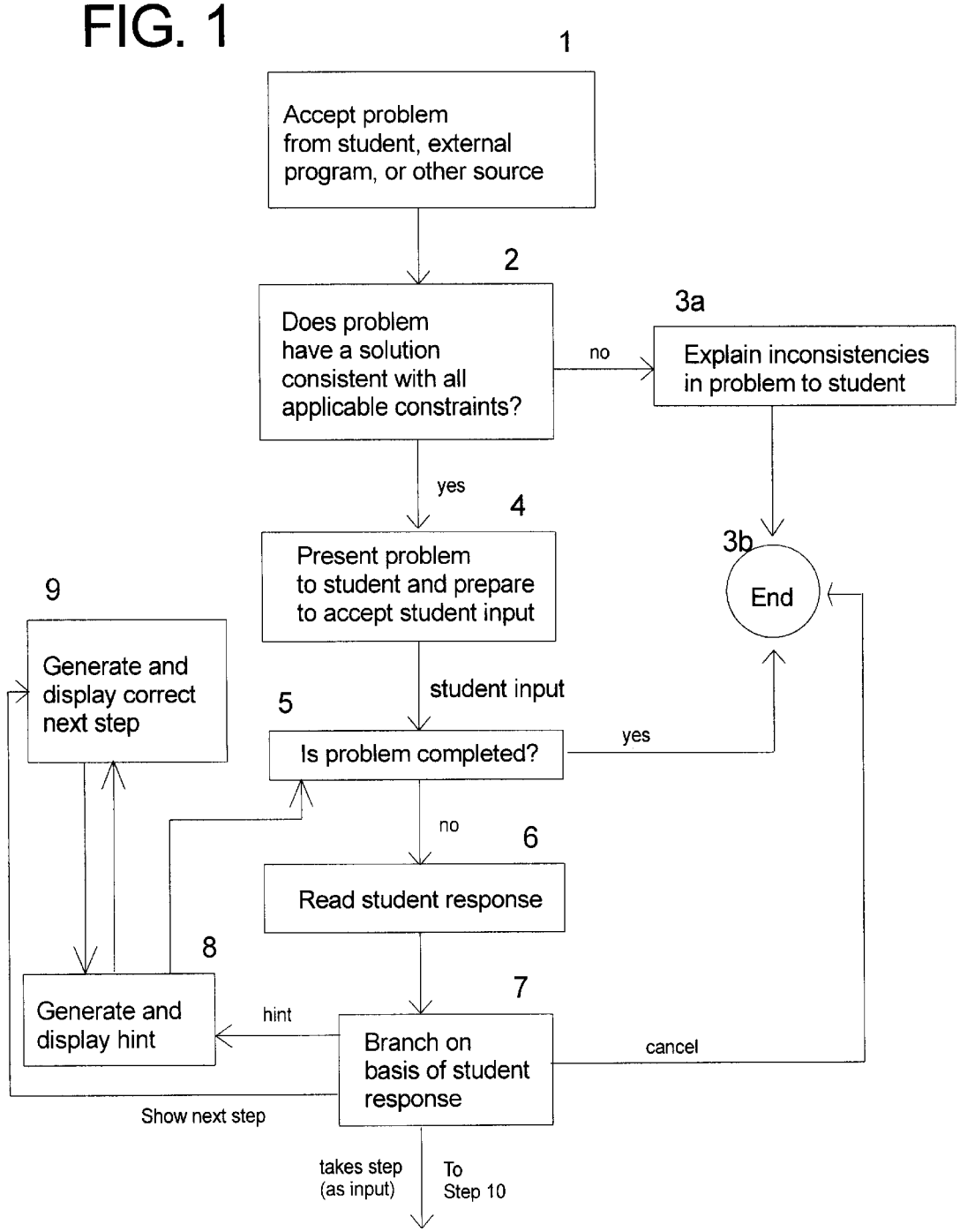
FIG. 1 shows a diagram representing the program flow of the overall improved methodology of an intelligent tutorial wherein a consistency rule is applied to identify and characterize a student error.
Figure 2:
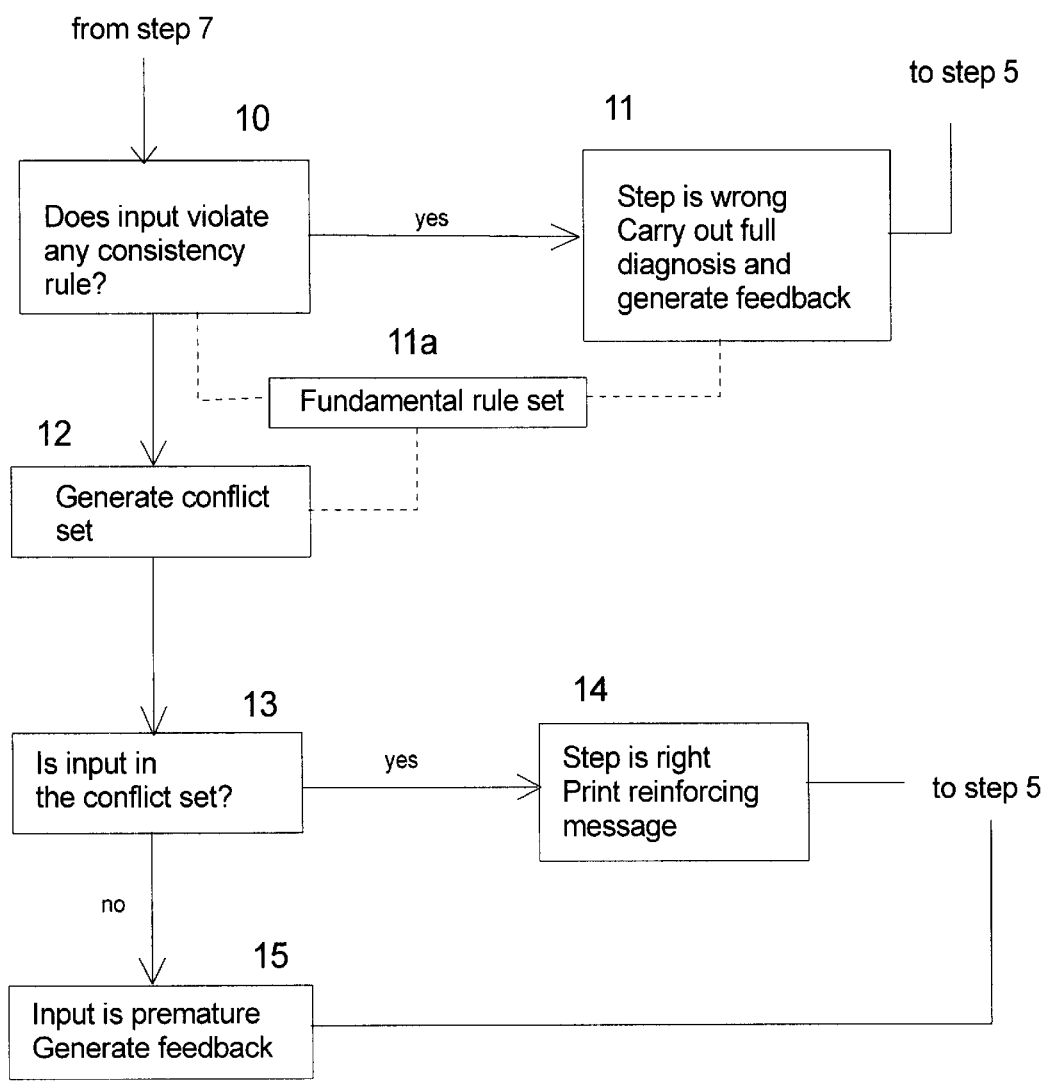
FIG. 2 is a diagram continuing the program flow of FIG. 1 for the overall methodology.

1 and FIG. 2, and by an example using subject matter for teaching chemistry, which example by no means limits the present invention to this particular curriculum.

After having been generated by a computer using the educational software, a problem is accepted (step 1) for display on the computer screen. The problem can be accepted (step 1) from the student, an external program, or any other source. The present invention is not limited as to the type of computer on which it runs. The computer typically includes an input device such a mouse and/or keyboard, and a display device such as a monitor. The computer also typically comprises a random access memory (RAM), a read only memory (ROM), a central processing unit (CPU), and a storage device such as a hard disk drive or a floppy disk drive. Embodied as computer-readable medium, the present methodology may reside in run-time medium such as the RAM or ROM, and in distribution media such as floppy disks, CD-ROMs, and hard disks capable of being executed by the computer or specialized device.

In the preferred embodiment, the problem accepted (step 1) by the computer does not accompany a group of multiple choice answers, rather, it is to be answered by the student in steps, thereby any wrong step can be identified as causing the error to the solution to allow a student to better rationalize his or her mistake. Though the program could be used to generate wrong answers for multiple choice problems, the preferred graphical user interface is a problem displayed wherein the student types in the input in the form of a step and any solution to the step, which is then read and interpreted by the system as further described.

The problem, after having been accepted (step 1), is next evaluated to determine if the problem has a solution consistent with all applicable constraints (step 2). All consistency rules are applicable from the very first stage and remain applicable by being capable of explaining inconsistencies throughout the steps of the solution and not just a final solution.

Programmed artificial intelligence allows each step taken by the student to branch into variable system responses. Accordingly, after step 2, if the problem does not have a solution consistent with all applicable constraints, the inconsistencies in the problem are explained (step 3a) and the problem session ends (step 3b). The following example 1 shows an oxidation problem that does not have a self-consistent solution. The example shows the tutor output when the problem is entered.

EXAMPLE 1

You entered:
A1B2
Here's as far as I was able to get on this problem.
Partial solution:
  Step 1: Assign B=−5 by the Nonmetal Rule.
After this, the Sum Rule says assign A1=+10 but the problem is that since aluminum only has three valence electrons, an oxidation number greater than +3 is not reasonable. So, there is no solution to this problem that is consistent with all the rules. An unworkable problem means that the oxidation number model is just not appropriate for the formula you entered. Sometimes this is because the formula is chemically invalid in some way, but there are also many real formulas for which oxidation numbers don't work. Try a different formula if you wish.

If the problem satisfies step 2, it is presented to the student and the program prepares itself to accept the student input (step 4). The student input as noted above involves typing a step that could ultimately yield the correct solution. After a student step is inputted then, the program determines if the problem has been completed (step 5). If the problem has been completed (step 5), the program ends (step 3b) with any appropriate response.

If the problem has not been completed and/or if there are any other steps necessary in the problem regardless of whether or not the problem is completed, the student response is read (step 6) and branched (step 7) appropriately. For example, a correct solution can yield a prompt for a next problem and/or a reinforcing message and the session ends (step 3b). The problem may also be skipped and a next question given, or the student can ask for a hint as another form of input(step 8), or help, resulting in a printed tutorial message. The hint input triggers the CR's to respond similar to an input of a violation of a step as attempted by the user, because feedback on a fundamental principle can still be generated as follows.

Depending then on the student response being read (step 6), if an input is performed by the student trying to solve the problem, the consistency rules are hereinafter applied to evaluate the step performed by the student as follows.

To determine if the step is wrong, the program asks itself if the input violated any consistency rule (step 10). An input will violate a consistency rule after a constraint of its solution is evaluated and compared to the fundamental rule set (step 11a), which fundamental rule set is the data structure storing a plurality of fundamental principles. Some examples of the fundamental rules or principles that can be used as part of the fundamental rule set are shown in table 1 below. This set is abbreviated and can be expanded on depending on the particular application. Each imposes a constraint on the solution resulting from an input.

TABLE 1

In a percentage composition problem, the sum of the percentages must equal 100.
In a chemical reaction, electronic charge is neither created nor destroyed.
An acidic solution has pH less than 7.
In an ionic compound, there must be no net charge.
Spontaneous chemical reactions are exothermic.
Any valid measurements must have units.
In Boyle's Law, if pressure is increased then volume must decrease.
In an ionic compound, the subscripts of the ions must have no common factor.
If compound A is more polar than compound B, then A is more soluble than B in water.
In a chemical reaction, it is impossible for the products to have greater mass then the reactants.
In the formula of an ionic compound the cation is written before the anion.

In this manner, an explanation for a student error is provided to deliver conceptual, qualitative feedback regardless of whether or not the exact step taken is anticipated. The consistency rules will further be described in relation to FIG. 3.

Continuing then with reference to FIG. 2 and the program flow, if the input violated any consistency rule (step 10), the step is concluded to be wrong and the feedback is generated (step 11). If the input violates a fundamental principle then the step is wrong regardless of any number value imposed for that solution. A full diagnosis involves identification of all such principles violated as well as identification of any buggy rules matched to additionally determine if the error was furthermore anticipated.

If the input did not violate any consistency rule (step 10) then the conflict set is generated (step 12). The conflict set is the set of all possible correct next steps generated by the expert system. The conventional assessment of "wrong" is that the student's step is not in the conflict set. In the present methodology, a more accurate and generalized interpretation of "wrong" is realized by coupling the generated conflict set (step 12) with the violation of the consistency rule (step 10), thereby forming a consistency-checked conflict set. Pseudocode segments for generating a consistency-checked conflict set (following step 10) would be as follows in example 2. The second segment may be used multiple times.

EXAMPLE 2

```
//Generate usual conflict set
    For each production rule P
        If P is applicable to the current problem state
            Add step(s) generated by P to conflict set
//Check each step in the conflict set for consistency with all
    rules
    For each step S in the conflict set
        For each consistency rule C //including production
            rules used as consistency rules
            If S violates constraint of C
                Remove S from conflict set and take additional
                    action as appropriate (possibly including print-
                    ing a message for the student and/or stopping
                    the problem)
```

Therefore it is then determined if the input is in the new conflict set (step 13) (consistency-checked conflict set). If the input is in the conflict step, the input is labeled to be correct (step 14) and an appropriate reinforcing message may be printed (step 15) and the problem may be complete to step 3*b* or another step necessary after step 5 determination.

If the input is not in the consistency-checked conflict set (step 13), the step is premature based on the input the student has shown so far. The step is premature inasmuch as any response should be reserved and commented further thereon (step 15). The program is adapted to hold the student's premature steps in reserve (step 15) for later comment as they become relevant. The idea is that a step may be right or wrong later on, but right now the main problem is the input is not yet logically derived from the student's work so far. It may not appear in the conflict set or violate a CR until some point in the future after the student has shown more work.

At that time, if the step is wrong it can also be explained by step 11. Traditionally, if an incorrect step is anticipated, i.e. the solution can be detected by a buggy rule after a comparison to the specific conflict set, an appropriate message is printed. A buggy rule matches the incorrect response to a pre-programmed misconception. If the buggy rule can produce the same incorrect response as the student, then the appropriate message would be that of a constructive explanation of the mistake as being a violation of a rule. However, if the buggy rule can not match the incorrect response of the student because it is not in the specific conflict set, there still should be an explanation and/or educational reply to the incorrect response. As a result, a consistency rule is applied (step 10) as a more general branch to the student response.

The application of the consistency rules (step 10) involves evaluating the constraint on the input of the step. Implemented in a chemistry tutorial, for example, by doing more than just matching a group of steps as would be performed by a production rule, if a solution is outside a valid range, it may violate a chemical principle for the step. The consistency rule asks itself whether the unreasonable input is chemically right or wrong. By evaluating a range of the solution, even if the incorrect solution is not matched to a buggy rule, the program can still educate a student on a chemical principle, rather than just say a student is incorrect for some unknown reason. Thus, in lieu of production rules, the program uses consistency rules that can include a particular conflict set realized by production rules, and can include much more. A pseudocode segment outlining how one can give feedback to a student for a wrong step is further realized by example 3, which is further diagrammatically illustrated by FIG. 3.

EXAMPLE 3

```
//Find all consistency rules violated by student's step
    For each consistency rule C
        If student step S violates C
            Add C to list of violated consistency rules
//Additionally check whether error is anticipated
    For each buggy rule B
        If S matches action of B
            Add B to list of matched buggy rules
Select at least one violated consistency rule and tutor student
on violated applicable principle.
Optionally select an applicable buggy rule and generate
feedback on anticipated error.
```

A solution outside of a range, for example, may include all negative numbers, where an ideal gas law equation requires an answer for temperature in units Kelvin when given unit of pressure in atmospheres, volume in Liters, and a gas constant of 0.08205. If a student has forgotten to convert the units of one of the variables, which resulted in a wrong answer, a buggy rule might match the student's wrong step because the conversion of units would be a common error.

However, what if the student made an unpredictable error, but which, for example, resulted in a negative temperature value? A buggy rule could not match the wrong solution because the solution in the input step taken by the student is too random. The lowest temperature in Kelvin can only be absolute zero. The present consistency rules (from step 10) are not required to determine what the student did to get this solution either, but they can tell the student that it knows the answer is nonetheless wrong because it violates the chemical principle that says "temperature on the Kelvin scale cannot be negative." It does this by identifying that the solution in the step is outside of the required range for this principle after the fundamental rule set comparison. Thus, the student is not prompted by the system saying "the answer is incorrect, I do not know what you did," rather it says "the answer is incorrect, but you should know that it violates the following principle: a temperature in Kelvin can not be negative because Kelvin is read from a scale of absolute zero." This provides the student with a concrete and specific example of inconsistency in the context of which to examine his or her work.

Even when, after the constraint on the input is imposed, the student's solution is within the particular range of a given single consistency rule but is still incorrect, the present consistency rules (from step 10) can still say something educationally useful to the student.

Figure 3:
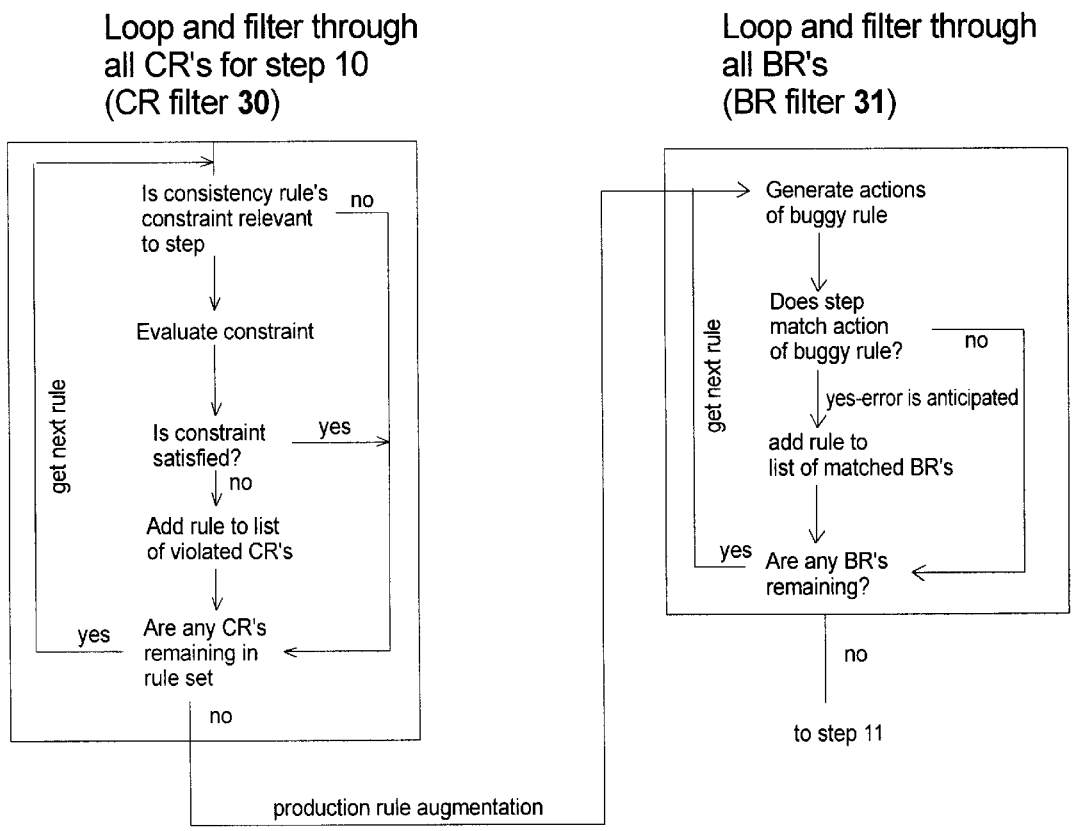
FIG. 3 is a diagram representing the functions performed when the consistency rules are looped over and applied, after which the buggy rules are looped over for further augmentation.

With reference then to FIG. 3, the consistency rules (from step 10) involve allowing the incorrect input resulting in a solution to be looped and filtered through constraints in all consistency rules to find a possible error in a step. This is essential in a tutorial because a wrong answer will always violate some principle of understanding. It is important then that the constraint be tied to a concept either at that particular step, or at some point during the problem. Thus, a loop over all CR's (CR filter 30) in the system is performed, and then a loop over all buggy rules (BR filter 31) is utilized. This loop over all CR's can then allow multiple error diagnosis resulting from a single input of a single wrong step. The value of just having a constraint on the solution does not gain nearly as much by itself. The constraint needs to correspond directly to at least one concept or principle (resulting from at least one CR) in order to deliver conceptual, qualitative feedback (step 11).

Figure 4:
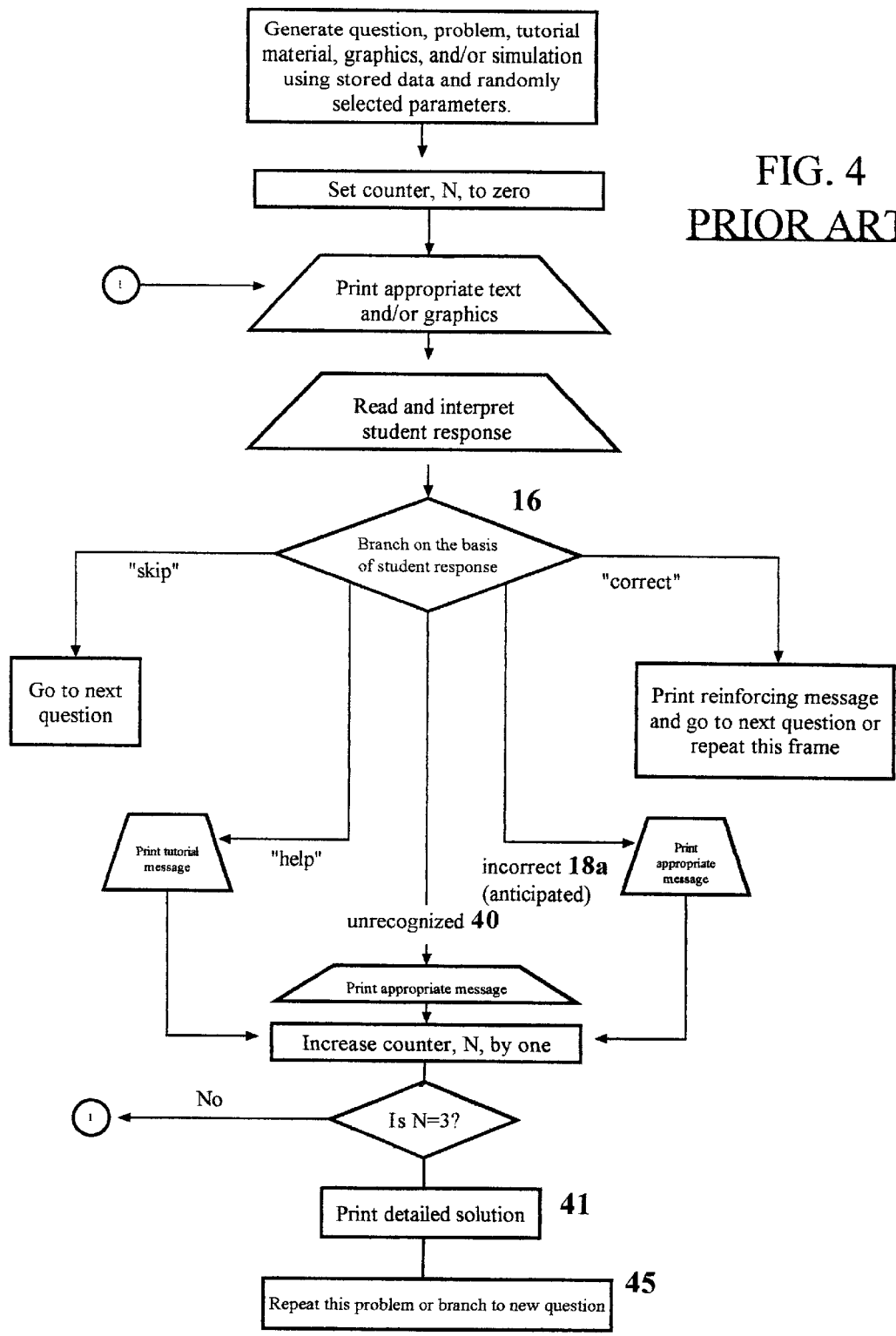
FIG. 4 shows a prior art flow diagram of a typical tutorial program using artificial intelligence and wherein an unrecognized wrong answer cannot assist a student because the incorrect answer is not anticipated.

The consistency rules (from step 10) are programmed differently than buggy rules because no steps are taken. Because there are so many possible mistakes a student can make, it is not always important to find out what a student did in his or her incorrect solution, but it is important to say something meaningful. This is evident as seen in relation to prior art FIG. 4.

The student response branch 16 does not show the use of consistency rules and, in lieu of providing any conceptual response, the area is occupied in this flow diagram as "unrecognized" 40. This occurs because the incorrect or anticipated solution 18 has not been reasoned by the program because the program does not know where the answer comes from. The production rules have not made a match to a possibly incorrect step. Rather than address another possible misconception to help the student understand a possible violation of a principle or inform the student of something maybe he or she forgot from the past, as in the present model, the program just repeats the problem 45, ultimately printing out a solution 41. The student will never be taught or reminded of a principle necessary for solving this and other problems by just reading the solution. Problems are best understood and solved not by memorization, but by understanding.

An example of the typical user interface and operation of the tutorial program implementing the consistency rules and showing a problem answered in terms of the input being steps and/or hints is shown using the following example.

EXAMPLE 4

You entered:
You might find calcium carbonate in your medicine cabinet at home. It is used to make antacid and tooth powder.
Try this problem.
Problem
Find the oxidation numbers for CaCO3.
Student action: Assign Ca=+1.
Sorry, that's wrong.
  * There's a special rule that tells you the oxidation number of a Group 2 metal like calcium in a compound, but what you did is not consistent with that rule.
Student action: Assign Ca=+2.
Correct!
Student action: Asked for a hint.
  If a compound is ionic, did you know that the oxidation numbers in the cation and the anion don't depend on each other?
Student action: Split into subproblems:
Find the oxidation numbers for Ca.
Find the oxidation numbers for CO3.
No, but don't lose your confidence. Most people have trouble at first.
  * This compound is ionic, but you didn't separate it into its ions correctly.
Student action: Split into subproblems:
Find the oxidation numbers for Ca(+2).
Find the oxidation numbers for CO3(−2).
That's right.
Try this problem.
Find the oxidation numbers for CO3(−2).
Student action: Assign O=−3.
That's making an effort but it is not correct.
  ** One way you can tell your answer (−3) can't be right is that oxygen only needs two electrons to fill its outer shell, and so you'd never expect O to have an oxidation number more negative than −2.
Student action: Assign O=0.
That's making an effort but it is not correct.
  * There's a specific rule for oxygen that would tell you to do something different here.
Student action: Assign O=−2.
Right!
Student action: Assign C=+6.
I'm sorry, that is wrong.
  ** Carbon can't have an oxidation number this large. If all the electrons were lost from carbon's valence shell it would only have an oxidation number of +4.
  *** Did you forget that this species has a charge?
Student action: Assign C=+4.
Very good.
Solution
Step 1: Assign Ca=+2 by the Group 2 Metal Rule.
Step 2: Split into subproblems:
Find the oxidation numbers for Ca(+2).
Find the oxidation numbers for CO3(−2) by the Separate Ions Rule.
Subproblem: Find the oxidation numbers for CO3(−2).
  Solution:
Step 1: Assign O=−2 by the Oxygen Rule.
Step 2: Assign C=+4 by the Sum Rule.
CaCO3 is one of the most common minerals but you may not have heard of it before. Could you organize an investigation to find and list all the locations at your school where this mineral is found? You could begin with limestone rock, eggshells, and chalk. You might be surprised at the length of the list.
Talk To Your Teacher About This Project.
  Number of steps taken by student: 8
  Correct: 4 Incorrect: 4
  Number of rationalized mistakes: 1
  Number of hints asked for: 1
  Number of steps taken by tutor: 0
  * Consistency check failed using production rule as a consistency rule.
    ** Consistency check failed using pure consistency rule.
      *** Buggy rule matched.

As can be evident then, the consistency rule concept can be used to increase robustness in the problem solving expert system and can adequately give feedback or guidance on a student's mental scheme to allow the user to confront his or her mistakes in a more productive way. Some of the relevant functions that allow the present methodology to be programmed on a computer are shown using appendix A attached.

We claim:
1. A computerized method for providing a meaningful response in an intelligent tutor, comprising:
  receiving an input from a user solving a problem;
  determining if said input violates at least one consistency rule, wherein a constraint of said input is evaluated and compared to a fundamental rule set for said problem; and,
  generating conceptual feedback to said user, wherein said feedback is generated even when said input is not anticipated by said intelligent tutor.

2. The method of claim 1, wherein said constraint is imposed on said input by at least one fundamental rule of said fundamental rule set.

3. The method of claim 1, wherein said feedback involves telling said user said input is wrong because it violates said fundamental rule.

4. A computerized method for providing a meaningful response in an intelligent tutor, comprising:

accepting a problem;

determining if said problem has a solution consistent with a plurality of applicable constraints;

receiving an input having at least one of said constraints imposed thereon from a user solving said problem;

determining if said input violates a consistency rule, wherein said at least one of said constraints is evaluated and compared to a fundamental rule set; and, generating conceptual feedback to said user, wherein said feedback is generated even when said input is not anticipated by said intelligent tutor.

5. The method of claim 4, wherein said feedback involves telling said user said input is wrong because said input violates at least one fundamental rule of said fundamental rule set.

6. The method of claim 4, further comprising the step of explaining inconsistencies in said problem when said problem does not have a solution consistent with all applicable constraints.

7. A computerized method for providing a meaningful response in an intelligent tutor, comprising:

receiving an input from a user solving a problem;

determining if said input violates at least one consistency rule, wherein a constraint of said input is evaluated and compared to a fundamental rule set for said problem;

generating a conflict set when said input does not violate said consistency rule, thereby forming a consistency-checked conflict set;

determining if said input is in said consistency-checked conflict set; and, generating feedback to said user.

8. The method of claim 7, wherein said conflict set comprises a plurality of steps produced by production rules.

9. The method of claim 8, wherein said plurality of steps are compared to said fundamental rule set.

10. The method of claim 7, wherein after the step of determining if said input is in said consistency-checked conflict set, said input is held as being premature for later feedback.

11. The method of claim 7, wherein said feedback involves telling said user said input is correct.

12. A computer-readable medium having computer executable instructions for performing a method for providing a meaningful response in an intelligent tutor, the method comprising:

receiving an input from a user solving a problem;

determining if said input violates at least one consistency rule, wherein a constraint of said input is evaluated and compared to a fundamental rule set for said problem; and, generating conceptual feedback to said user, wherein said feedback is generated even when said input is not anticipated by said intelligent tutor.

13. The medium of claim 12, wherein said constraint is imposed on said input by at least one fundamental rule of said fundamental rule set.

14. The medium of claim 12, wherein said feedback involves telling said user said input is wrong because it violates said fundamental rule.

15. A computer-readable medium having computer executable instructions for performing a method for providing a meaningful response in an intelligent tutor, the method comprising:

receiving an input from a user solving a problem;

determining if said input violates at least one consistency rule, wherein a constraint of said input is evaluated and compared to a fundamental rule set for said problem;

generating at least one conflict set when said input does not violate said consistency rule, thereby forming a consistency-checked conflict set;

determining if said input is in said consistency-checked conflict set; and, generating feedback to said user.

16. The medium of claim 15, wherein after the step of determining if said input is in said consistency-checked conflict set, said input is held as being premature for later feedback.

17. The medium of claim 15, wherein said feedback involves telling said user said input is correct.

* * * * *